United States Patent
Li et al.

(10) Patent No.: US 11,428,921 B2
(45) Date of Patent: Aug. 30, 2022

(54) PRISM DEVICE APPLIED TO PERISCOPE LENS MODULE AND PERISCOPE LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/991,043

(22) Filed: Aug. 12, 2020

(65) Prior Publication Data

US 2020/0379241 A1   Dec. 3, 2020

Related U.S. Application Data

(63) Continuation of application No. PCT/CN2019/089729, filed on Jun. 1, 2019.

(51) Int. Cl.
*G02B 23/08* (2006.01)
*G02B 5/04* (2006.01)
*G02B 7/02* (2021.01)

(52) U.S. Cl.
CPC .............. *G02B 23/08* (2013.01); *G02B 5/04* (2013.01); *G02B 7/022* (2013.01)

(58) Field of Classification Search
CPC . G02B 3/08; G02B 5/04; G02B 7/022; G02B 23/08; G02B 23/16
See application file for complete search history.

(56) References Cited

U.S. PATENT DOCUMENTS

| | | | | |
|---|---|---|---|---|
| 2001/0022688 A1* | 9/2001 | Kosaka | ................ | G02B 27/646 359/557 |
| 2008/0225139 A1* | 9/2008 | Nomura | ............... | H04N 5/2257 348/E5.025 |
| 2010/0321494 A1* | 12/2010 | Peterson | ............. | H04N 5/2254 348/340 |
| 2011/0267692 A1* | 11/2011 | Watanabe | .............. | G02B 27/46 359/557 |
| 2016/0187654 A1* | 6/2016 | Border | ............... | G02B 27/0172 359/630 |

(Continued)

*Primary Examiner* — William R Alexander
*Assistant Examiner* — Sharrief I Broome
(74) *Attorney, Agent, or Firm* — W&G Law Group (57) ABSTRACT

Provided is a prism device applied to a periscope lens module. The prism device includes: a bearing frame; an elastic member including first and second elastic frames; a driving member; a supporting member including a relying portion and rotatably mounted to the bearing frame through the elastic member; and a prism. The driving member drives the supporting member and the prism to rotate relative to the bearing frame. The first and second elastic frames include a first clamping portion and a second clamping portion, respectively, and the first clamping portion and the second clamping portion clamp the relying portion from two opposite sides thereof in such a manner that the supporting member is rotatable about the relying portion. Therefore, when the driving member is driven by the driving member, the prism can be driven to rotate relative to the bearing frame, thereby automatically correcting an angle of the prism.

16 Claims, 9 Drawing Sheets

(56) References Cited

U.S. PATENT DOCUMENTS

2018/0231793 A1* 8/2018 Jeong ................. G03B 5/00
2019/0387140 A1* 12/2019 Zhang ............... H04N 5/2253
2020/0006717 A1* 1/2020 Lei .................. H04M 1/72409

* cited by examiner

PRISM DEVICE APPLIED TO PERISCOPE LENS MODULE AND PERISCOPE LENS MODULE

TECHNICAL FIELD

The present invention relates to the technical field of optical imaging, and more particularly, to a periscope lens module applied to mobile electronic devices such as mobile phones, and a prism device applied thereto.

BACKGROUND

In recent years, with development of imaging technologies and rise of electronic products having imaging functions, optical lenses have been widely applied in various electronic products. In order to improve an imaging quality, optical image stabilization is essential.

The present invention aims to provide a new periscope lens module having an image stabilization function, and a prism device applied thereto.

SUMMARY

The present invention aims to provide a prism device applied to a periscope lens module, which has a low cost at adjusting an angle of the prism inside the lens.

Technical solutions of the present invention will be described as follows.

In order to achieve the above-mentioned purpose, the present invention provides a prism device applied to a periscope lens module. The prism device includes: a bearing frame; an elastic member; a driving member; a supporting member; and a prism mounted to the supporting member and configured to receive light. The supporting member is rotatably mounted to the bearing frame through the elastic member. The driving member is connected between the supporting member and the bearing frame and configured to drive the supporting member and the prism to rotate relative to the bearing frame. The elastic member includes a first elastic frame and a second elastic frame. The supporting member includes a relying portion. The first elastic frame includes a first clamping portion. The second elastic frame includes a second clamping portion, and the first clamping portion and the second clamping portion clamp the relying portion from two opposite sides thereof in such a manner that the supporting member is rotatable about the relying portion.

As an improvement, the bearing frame includes a side plate, and a bottom plate having an end connected to an end of the side plate; the supporting member includes a supporting frame connected to the prism, and a supporting plate spaced apart from and opposite to the side plate of the bearing frame; the supporting frame includes a connecting portion connected to the supporting plate; the relying portion is provided on the connecting portion; and the first elastic frame and the second elastic frame are located between the connecting portion and the bottom plate of the bearing frame.

As an improvement, the first clamping portion includes two ends that are opposite to each other, and the first elastic frame further includes: two first extending portions extending from the two ends of the first clamping portion while being bent, two first bending portions each connected to an end of one of the two first extending portions, two second extending portions each extending from an end of one of the two first bending portions, and two first mounting portions each bent from an end of one of the two second extending portions. The second clamping portion includes two ends that are opposite to each other, and the second elastic frame further includes: two third extending portions extending from the two ends of the second clamping portion while being bent, two second bending portions each connected to an end of one of the two third extending portions, two fourth extending portions extending from an end of one of the second bending portions, and two second mounting portions bent from an end of one of the two fourth extending portions. The bottom plate of the bearing frame is provided with two snap grooves, and each of the first mounting portion and the second mounting portion is snapped into a corresponding one of the two snap grooves.

As an improvement, the relying portion includes a top surface and a bottom surface that are opposite to each other, the bottom surface faces towards the bottom plate of the bearing frame, and the top surface faces away from the bottom plate of the bearing frame; and the top surface and the bottom surface of the relying portion both protrude from any other part of the connecting portion close to the relying portion.

As an improvement, a direction from one end to the other end of the first clamping portion is defined as a length direction of the first clamping portion, and a direction perpendicular to the length direction and parallel to the connecting portion is defined as a width direction of the first clamping portion; and a middle portion between the two ends of the first clamping portion is provided with an abutting portion having an increased width smaller than or equal to a width of the relying portion; or a direction from one end to the other end of the second clamping portion is defined as a length direction of the second clamping portion, and a direction perpendicular to the length direction of the second clamping portion and parallel to the connecting portion is defined as a width direction of the second clamping portion; and a middle portion between the two ends of the second clamping portion is provided with an abutting portion having an increased width smaller than or equal to the width of the relying portion.

As an improvement, the first bending portion and the second bending portion are parallel to the bottom plate of the bearing frame, respectively; and the first extending portion, the second extending portion and the fourth extending portion are each perpendicular to the bottom plate of the bearing frame.

As an improvement, the driving member includes a plurality of shape memory alloy wires connected between the supporting plate and the side plate of the bearing frame.

As an improvement, the bearing frame further includes a plurality of snap joints provided on the side plate, the supporting plate is mounted to the plurality of snap joints through the plurality of shape memory alloy wires, and a side of the supporting plate facing towards the side plate is provided with a plurality of hooks for matching the plurality of snap joints and fixing the plurality of shape memory alloy wires.

As an improvement, the plurality of shape memory alloy wires includes four shape memory alloy wires, the plurality of snap joints includes four snap joints and the plurality of hooks includes four hook; and each of the four shape memory alloy wires includes two ends respectively connected to two adjacent snap joints of the four snap joints, and a middle portion connected to one of the four hooks.

As an improvement, the bearing frame further includes two first limiting plates for restricting the support member from moving out of the bearing frame, and the two first limiting plates are respectively connected to another end of the side plate and another end of the bottom plate; the supporting frame further includes: an inclined plate to which a prism is mounted, and second limiting plates respectively connected to two ends of the inclined plate and each having an included angle with respect to the inclined plate; the connecting portion includes one end connected to a middle part of the inclined plate, and another end passing through the elastic member and inserted in the supporting plate; and the two second limiting plates respectively correspond to the two first limiting plates.

The present invention provides a periscope lens module, including a shell frame, a lens assembly mounted to a middle part of the shell frame, an image sensor mounted to an end of the shell frame and located at an image side of the lens assembly, and the prism device applied to the periscope lens module as described above. The prism device is mounted to another end of the shell frame and located at an object side of the lens assembly for receiving light.

The present invention has following beneficial effects. In the present invention, the first elastic frame and the second elastic frame clamp the relying portion of the supporting member from two sides thereof in such a manner that the supporting member is rotatably mounted to the bearing frame. Therefore, when the driving member is driven by the driving member, the prism can be driven to rotate relative to the bearing frame, thereby automatically correcting an angle of the prism. The periscope lens module using the prism device has a wider imaging angle and a better imaging effect. The prism device uses shape memory alloy wires instead of the original electromagnetic driving, thereby avoiding electromagnetic interference and reducing a weight and manufacturing cost of the prism device.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will be further described in the following with reference to the accompany drawings and embodiments.

It should be noted that each directional indication (such as up, down, inner, outer, top, bottom, etc.) recited in the embodiments of the present invention is merely for explaining a relative position relation between components in a specific posture, or the like. If this specific posture changes, the directional indication changes accordingly.

It should also be noted that in a case where an element is referred to as being "fixed" or "provided" on another element, the element may be directly provided on the other element or there may be an intermediate element therebetween. In a case where an element is referred to as being "connected" to another element, the element may be directly connected to the other element or there may be an intermediate element therebetween.

With reference to FIG. 1 to FIG. 9, embodiments of the present invention provide a prism device 1 applied to a periscope lens module. The prism device 1 includes a bearing frame 10, an elastic member 20, a supporting member 30, a driving member 40, and a prism 50 mounted to the supporting member 30 and configured to receive light. The supporting member 30 is movably mounted to the bearing frame 10 through the elastic member 20. The driving member 40 is connected between the bearing frame 10 and the supporting member 30 and configured to drive the supporting member 30 to rotate in the bearing frame 10 about an X axis direction or a Y axis direction, so that the prism 50 can automatically correct an angle of the prism under driving of the driving member 40, thereby improving imaging quality. Herein, a width direction of the bearing frame 10 is defined as the X axis direction, a height direction of the bearing frame 10 is defined as the Y axis direction, and a length direction of the bearing frame 10 is defined as a Z axis direction. The X axis direction, the Y axis direction, and the Z axis direction are perpendicular to each other.

Figure 2:
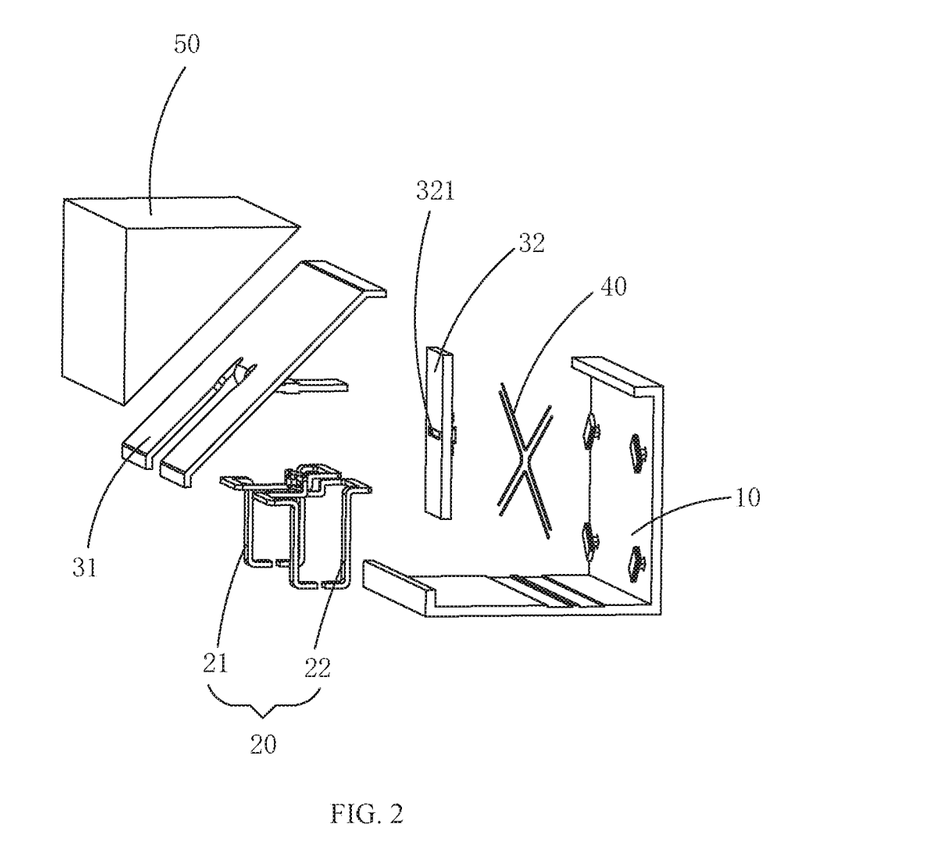
FIG. 2 is an exploded view of the prism device applied to the periscope lens module shown in FIG. 1.
Figure 3:
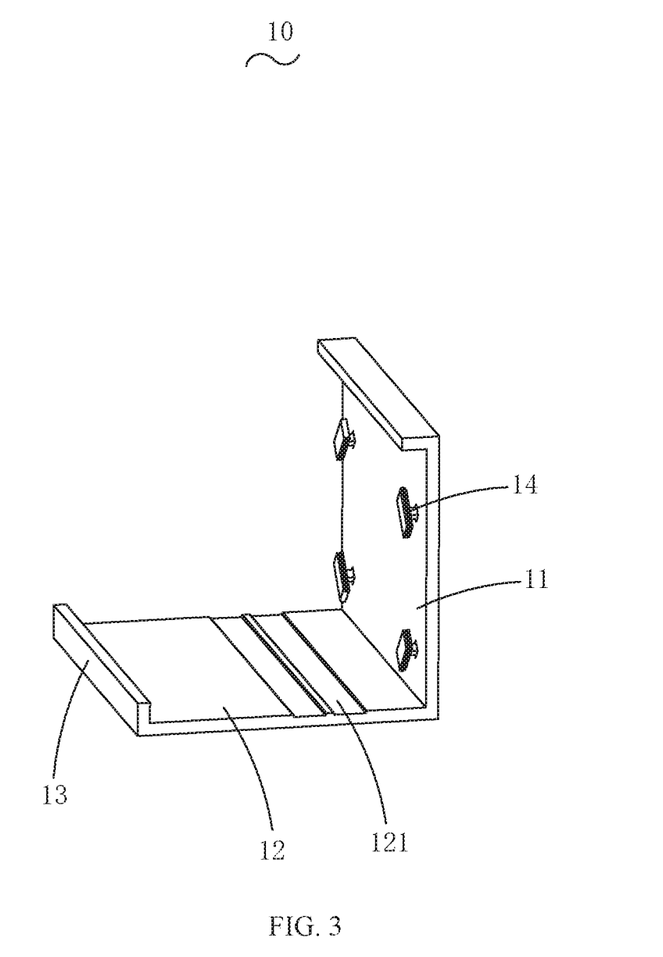
FIG. 3 is a perspective view of a bearing frame according to the present invention.

With reference to FIG. 2 and FIG. 3, the bearing frame 10 includes a side plate 11, a bottom plate 12, and two first limiting plates 13. An end of the bottom plate 12 is perpendicularly connected to an end of the side plate 11, and the two first limiting plates 13 are perpendicularly connected to the other end of the side plate 11 and the other end of the bottom plate 12, respectively. A side surface of the side plate 11 facing towards the supporting member 30 is provided with a number of snap joints 14, and the snap joint 14 may be formed into one piece with the side plate 11 or may be mounted to the side plate 11 in any existing mounting way. In this embodiment, the snap joint 14 is mounted to the side plate 11, which can simplify a structure of the bearing frame 10 and reduce a manufacturing cost of the bearing frame 10. The driving member 40 includes a number of shape memory alloy wires. The supporting member 30 is mounted to the snap joints 14 through the shape memory alloy wires 40. The two first limiting plates 13 are configured to restrict the support member 30 from moving out of the bearing frame 10. A surface of the bottom plate 12 corresponding to the elastic member 20 is provided with a snap groove 121, so as to roughly locate the elastic member 20. Therefore, an efficiency and accuracy of assembling between the elastic member 20 and the bearing frame 10 can be improved.

Figure 1:
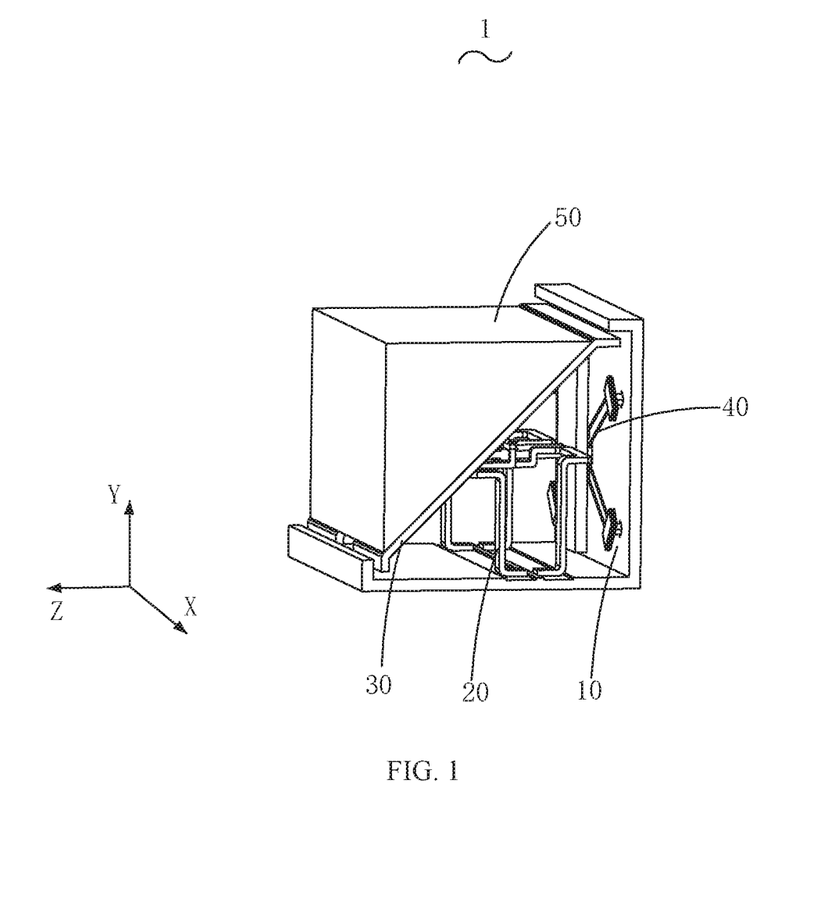
FIG. 1 is a perspective view of a prism device applied to a periscope lens module according to the present invention.
Figure 4:
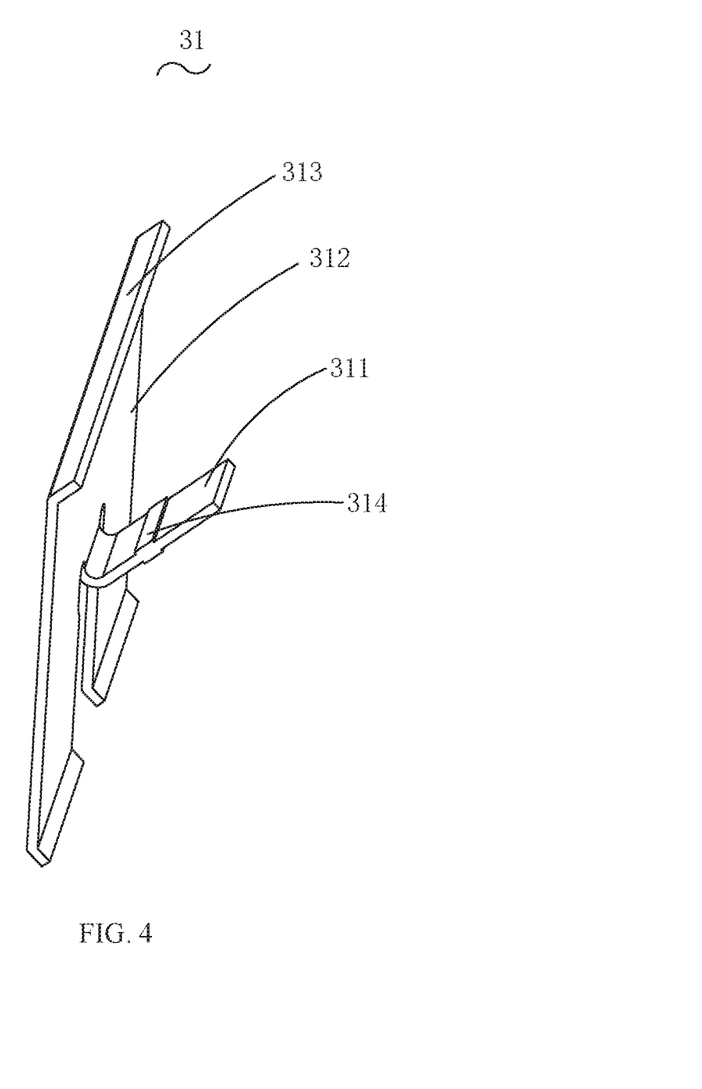
FIG. 4 is a perspective view of a supporting frame according to the present invention.

With reference to FIG. 1, FIG. 2 and FIG. 4, the supporting member 30 includes a supporting frame 31 for supporting the prism 50, and a supporting plate 32 spaced apart from the bearing frame 10. In this embodiment, the supporting plate 32 is parallel to the side plate 11 of the bearing frame 10, and the supporting plate 32 is provided with a mounting groove 321, into which the supporting frame 31 is inserted. The supporting frame 31 includes a connecting portion 311 connected to the supporting plate 32, an inclined plate 312, to which the prism 50 is mounted, and second limiting plates 313 respectively connected to two ends of the inclined plate 312 and having an included angle with respect to the inclined plate 312. The connecting portion 311 includes one end connected to a middle part of the inclined plate 312, and another end passing through the elastic member 20 and inserted in the mounting groove 321 in the supporting plate 32. A relying portion 314 is formed at a position where the connecting portion 311 is connected to the elastic member 20. In an embodiment, the relying portion 314 has a thickness greater than a thickness of any other portion of the member 311 to increase strength thereof. For example, top and bottom surfaces of the relying portion 314 exceed top and bottom surfaces of any other part of the connecting portion 311. The two second limiting plates 313 correspond to the two first limiting plates 13, respectively, thereby preventing the supporting frame 31 from being thrown out of the bearing frame 10 when the prism device 1 applied to the periscope lens module is falling off.

Figure 5:
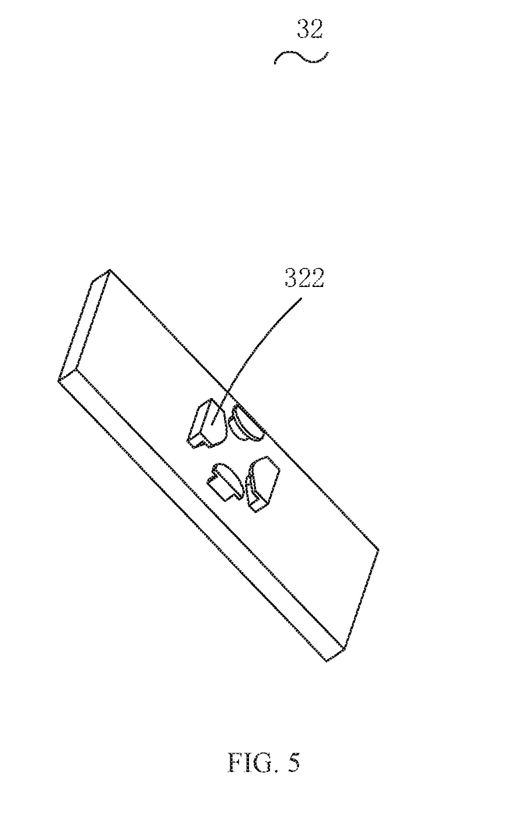
FIG. 5 is a perspective view of a supporting plate according to the present invention.

With reference to FIG. 5, in an embodiment, a side of the supporting plate 32 facing towards the side plate 11 is provided with a plurality of hooks 322 for matching the snap joints 14 and fixing respective shape memory alloy wires 40. In this embodiment, four shape memory alloy wires 40, four snap joints 14 and four hooks 322 are provided. Each shape memory alloy wire 40 includes two ends fixedly connected to two adjacent snap joints 14, respectively, and a middle portion connected to one of the hooks 322. In this way, each shape memory alloy wire 40 is formed into a "V" shape. The four hooks 322 are arranged at four sides of a quadrilateral, respectively. Each of the hooks 322 has a cross-section of an "L" shape. This can prevent the shape memory alloy wire 40 from falling out due to shaking.

Figure 6:
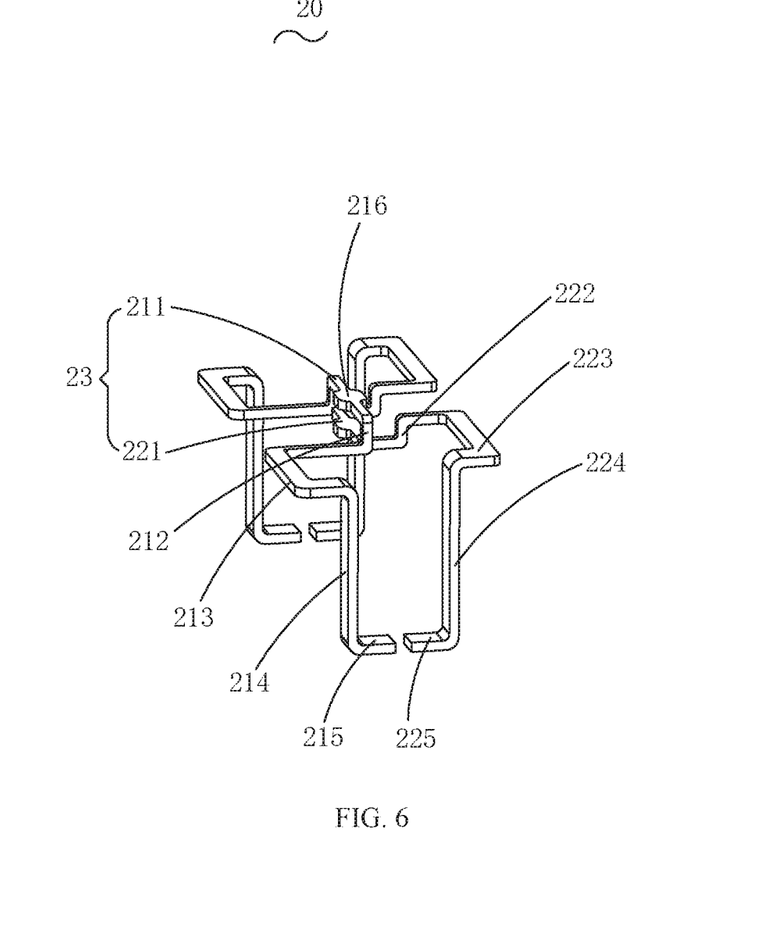
FIG. 6 is a perspective view of an elastic member according to the present invention.

With reference to FIG. 2 and FIG. 6, in this embodiment, the elastic member 20 includes a first elastic frame 21 and a second elastic frame 22. For example, each of the first elastic frame 21 and the second elastic frame 22 is formed by bending a single elastic material. The first elastic frame 21 and second elastic frame 22 define a clamping structure 23 for fixing the connecting portion 311 of the supporting frame 31.

In an embodiment, the first elastic frame 21 includes a first clamping portion 211, two first extending portions 212 extending from two ends of the first clamping portion 211 while being bent, a first bending portion 213 connected to an end of the first extending portion 212, a second extending portion 214 extending from an end of the first bending portion 213, and a first mounting portion 215 bent from an end of the second extending portion 214. In an example, the first bending portion 213 has a U-shaped structure, and two ends of the U-shaped structure are respectively connected to the first extending portion 212 and the second extending portion 214. The first extending portion 212 and the second extending portion 214 are parallel to each other and are perpendicular to the bottom plate 12 of the bearing frame 10. The first mounting portion 215 is parallel to the bottom plate 12 and snapped into the snap groove 121. The first bending portion 213 may also has an L-shaped structure or a structure of other shape.

The second elastic frame 22 has a similar structure, including a second clamping portion 221, two third extending portions 222 extending from two ends of the second clamping portion 221 while being bent, a second bending portion 223 connected to an end of the third extending portion 222, a fourth extending portion 224 extending from an end of the second bending portion 223, and a second mounting portion 225 bent from an end of the fourth extending portion 224. In an example, the second bending portion 223 has a U-shaped structure, and two ends of the U-shaped structure are respectively connected to the third extending portion 222 and the fourth extending portion 224. In an example, the third extending portion is L-shaped. The second bending portion 223 is parallel to the bottom plate 12 of the bearing frame 10, and the third extending portion 222 and the fourth extending portion 224 are perpendicular to a plane where the second bending portion 223 is located. The fourth extending portion 224 is perpendicular to the bottom plate 12 of bearing frame 10. The second mounting portion 225 is parallel to the bottom plate 12 and is snapped into the snap groove 121. The first clamping portion 211 of the first elastic frame 21 and the second clamping portion 221 of the second elastic frame 22 are respectively clamped at two sides of the relying portion 314 of the connecting portion 311, and together form a clamping structure 23.

A direction from one end to the other end of the first clamping portion 211 is defined as a length direction of the first clamping portion 211, and a direction perpendicular to the length direction and parallel to the connecting portion 311 is defined as a width direction of the first clamping portion 211. A middle part between the two ends of the first clamping portion 211 is provided with an abutting portion 216 having an increased width. A direction from one end to the other end of the second clamping portion 221 is defined as a length direction of the second clamping portion 221, and a direction perpendicular to the length direction of the second clamping portion 221 and parallel to the connecting portion 311 is defined as a width direction of the second clamping portion 221. A middle part between the two ends of the second clamping portion 221 is provided with an abutting portion 216 having an increased width. The length directions and the width directions of the first clamping portion 211 and the second clamping portion 221 are respectively consistent with the length direction and the width direction of the relying portion 314. The abutting portion 216 of the first clamping portion 211 and the abutting portion 216 of the second clamping portion 221 are configured to abut against a top surface and a bottom surface of the relying portion 314, respectively. In an example, a width of the abutting portion 216 is substantially equal to a width of the relying portion 314. The width of the abutting portion 216 is greater than a width of any other part of the first clamping portion 211. The width of the abutting portion 216 is greater than a width of any other portion of the second clamping portion 221. The width of the abutting portion 216 is consistent with the width of the relying portion 314. Such arrangement can improve an accuracy and strength of assembling between the supporting frame 31 and the elastic member 20. It should be noted that the width of the abutting portion 216 may also be slightly smaller than the width of the relying portion 314.

Figure 7:
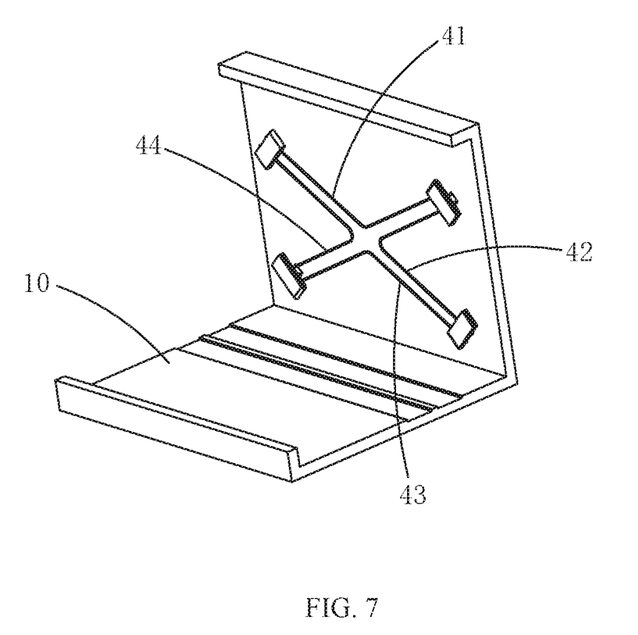
FIG. 7 is a perspective view of a shape memory alloy wire mounted to a bearing frame according to the present invention.

With reference to FIG. 2, FIG. 5 and FIG. 7, the four shape memory alloy wires 40 are equally distributed between the supporting plate 32 and the side plate 11 in the prism device 1 applied to the periscope lens module. In an example, the four snap joints 14 are respectively located at four corners of a quadrilateral shape, and the four hooks 322 are located at a position close to a center of the quadrilateral. In this case, the four shape memory alloy wires 40 can be used to indirectly drive the prism 50 to achieve a pushing force in the Y axis direction relative to the bearing frame 10, thereby driving the prism 50 to rotate about the X axis. The four shape memory alloy wires 40 drive the prism 50 to achieve a pushing force in the X axis direction relative to the bearing frame 10, thereby driving the prism 50 to rotate about the Y axis.

For example, the four shape memory alloy wires 40 may include a first shape memory alloy wire 41, a second shape memory alloy wire 42, a third shape memory alloy wire 43 and a fourth shape memory alloy wire 44. The first shape memory alloy wire 41 and the third shape memory alloy wire 43 are respectively arranged at an upper side and a lower side of the side plate 11 in the Y axis direction, and the first shape memory alloy wire 41 is located above the third shape memory alloy wire 43. The second shape memory alloy wire 42 and the fourth shape memory alloy wire 44 are respectively arranged at left and right sides of the side plate 11 in the X axis direction. As shown in FIG. 7, the second shape memory alloy wire 42 is located at the right side, and the fourth shape memory alloy wire 44 is located at the left side.

During an operation, as shown in FIG. 1, when the first shape memory alloy wire 41 is energized to be heated and shortened, the supporting plate 32 of the supporting member 30 is subjected to an upward pulling force and transmits this force to the connecting portion 311 of the supporting frame 31, so that the supporting frame 31 rotates in a counterclockwise direction about the X axis by using the relying portion 314 of the connecting portion 311 clamped in the clamping structure 23 of the elastic member 20 as a fulcrum. As a result, the prism 50 is driven to rotate relative to the bearing frame 10 in a counterclockwise direction about the X axis. When the third shape memory alloy wire 43 is energized to be heated and shortened, the prism 50 rotates relative to the bearing frame 10 in a clockwise direction about the X axis. When the second shape memory alloy wire 42 is energized to be heated and shortened, the prism 50 can rotate relative to the bearing frame 10 in one direction about the Y axis, and when the fourth shape memory alloy wire 44 is energized to be heated and shortened, the prism 50 can rotate relative to the bearing frame 10 in an opposite direction about the Y axis. The shape memory alloy wire 40 of the present invention may also be referred to as an SMA wire, and an instruction can be issued by a program to make the shape memory alloy wire 40 form a memory effect for generating a driving force, which will not be described in details herein.

Figure 8:
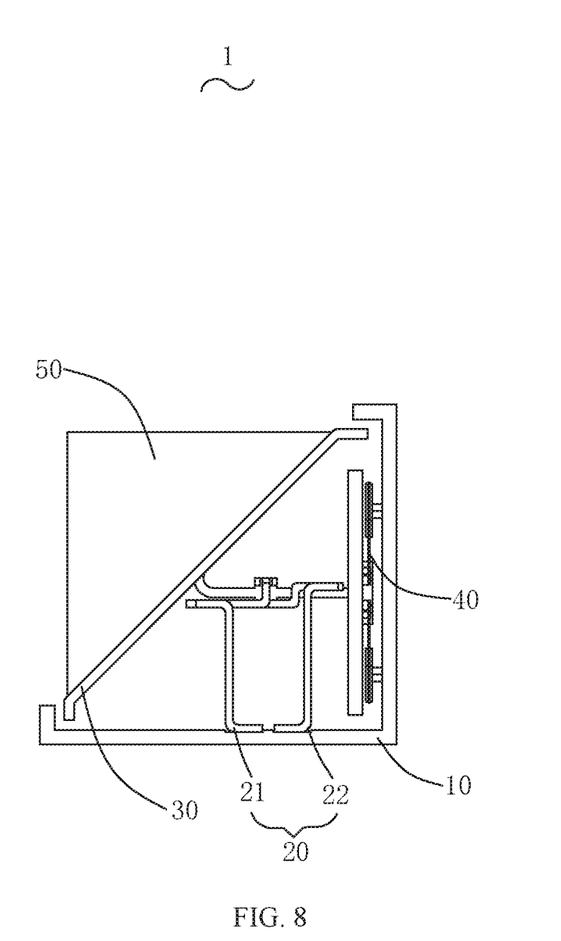
FIG. 8 is a side view of FIG. 1.
Figure 9:
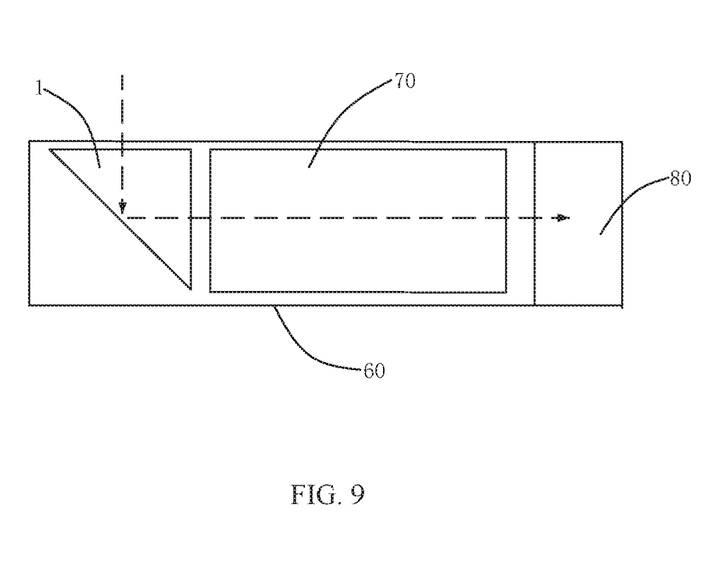
FIG. 9 is a perspective view of a periscope lens module according to the present invention.

With reference to FIG. 8, the present invention further provides a periscope lens module, which includes a shell frame 60, a lens assembly 70, an image sensor 80, and the prism device 1. The lens assembly 70 is mounted to a middle part of the shell frame 60. The image sensor 80 is mounted to an end of the shell frame 60 and located at an image side of the lens assembly 70. The prism device 1 is mounted to the other end of the shell frame 60 and located at an object side of the lens assembly 70 for receiving light. The light is reflected by the prism device 1 and then travels along a direction of an axis of the lens assembly 70 to reach the image sensor in a straight line for imaging. The light incident along the Y axis direction is reflected by the prism device 1 and then enters the lens assembly 70 along the Z axis. The light entering the lens assembly 70 along the Z axis is finally processed by the image sensor 80 for imaging. The periscope lens module can be applied to an electronic device with an imaging function. For example, the electronic device with the imaging function may be a mobile phone or a camera.

The above description merely illustrates some embodiments of the present invention. It should be noted that those skilled in the art can make improvements without departing from a creative concept of the present invention, but all these improvements shall fall into a scope of the present invention.

What is claimed is:

1. A prism device applied to a periscope lens module, comprising:
   a bearing frame;
   an elastic member;
   a driving member;
   a supporting member; and
   a prism mounted to the supporting member and configured to receive light,
   wherein the supporting member is rotatably mounted to the bearing frame through the elastic member, the driving member is connected between the supporting member and the bearing frame and configured to drive the supporting member and the prism to rotate relative to the bearing frame, the elastic member comprises a first elastic frame and a second elastic frame, the supporting member comprises a relying portion, the first elastic frame comprises a first clamping portion, the second elastic frame comprises a second clamping portion, and the first clamping portion and the second clamping portion clamp the relying portion from two opposite sides thereof in such a manner that the supporting member is rotatable about the relying portion, the bearing frame comprises a side plate, and a bottom plate having an end connected to an end of the side plate; the supporting member further comprises a supporting frame connected to the prism, and a supporting plate spaced apart from and opposite to the side plate of the bearing frame; the supporting frame comprises a connecting portion connected to the supporting plate; the relying portion is provided on the connecting portion; and the first elastic frame and the second elastic frame are located between the connecting portion and the bottom plate of the bearing frame,
   wherein the first clamping portion comprises two ends that are opposite to each other, and the first elastic frame further comprises: two first extending portions extending from the two ends of the first clamping portion while being bent, two first bending portions each connected to an end of one of the two first extending portions, two second extending portions each extending from an end of one of the two first bending portions, and two first mounting portions each bent from an end of one of the two second extending portions; the second clamping portion comprises two ends that are opposite to each other, and the second elastic frame further comprises: two third extending portions extending from the two ends of the second clamping portion while being bent, two second bending portions each connected to an end of one of the two third extending portions, two fourth extending portions extending from an end of one of the second bending portions, and two second mounting portions bent from an end of one of the two fourth extending portions; the bottom plate of the bearing frame is provided with two snap grooves, and each of the first mounting portion and the second mounting portion is snapped into a corresponding one of the two snap grooves.

2. The prism device applied to the periscope lens module as described in claim 1, wherein the relying portion comprises a top surface and a bottom surface that are opposite to each other, the bottom surface faces towards the bottom plate of the bearing frame, and the top surface faces away from the bottom plate of the bearing frame; and the top surface and the bottom surface of the relying portion both protrude from any other part of the connecting portion close to the relying portion.

3. The prism device applied to the periscope lens module as described in claim 2, wherein a direction from one end to the other end of the first clamping portion is defined as a length direction of the first clamping portion, and a direction perpendicular to the length direction and parallel to the connecting portion is defined as a width direction of the first clamping portion; and a middle portion between the two ends of the first clamping portion is provided with an abutting portion having an increased width smaller than or equal to a width of the relying portion; or a direction from one end to the other end of the second clamping portion is defined as a length direction of the second clamping portion, and a direction perpendicular to the length direction of the second clamping portion and parallel to the connecting portion is defined as a width direction of the second clamping portion; and a middle portion between the two ends of the second clamping portion is provided with an abutting portion having an increased width smaller than or equal to the width of the relying portion.

4. The prism device applied to the periscope lens module as described in claim 1, wherein the first bending portion and the second bending portion are parallel to the bottom plate of the bearing frame, respectively; and the first extending portion, the second extending portion and the fourth extending portion are each perpendicular to the bottom plate of the bearing frame.

5. The prism device applied to the periscope lens module as described in claim 1, wherein the driving member comprises a plurality of shape memory alloy wires connected between the supporting plate and the side plate of the bearing frame.

6. The prism device applied to the periscope lens module as described in claim 5, wherein the bearing frame further comprises a plurality of snap joints provided on the side plate, the supporting plate is mounted to the plurality of snap joints through the plurality of shape memory alloy wires, and a side of the supporting plate facing towards the side plate is provided with a plurality of hooks for matching the plurality of snap joints and fixing the plurality of shape memory alloy wires.

7. The prism device applied to the periscope lens module as described in claim 6, wherein the plurality of shape memory alloy wires comprises four shape memory alloy wires, the plurality of snap joints comprises four snap joints and the plurality of hooks comprises four hook; and each of the four shape memory alloy wires comprises two ends respectively connected to two adjacent snap joints of the four snap joints, and a middle portion connected to one of the four hooks.

8. The prism device applied to the periscope lens module as described in claim 1, wherein the bearing frame further comprises two first limiting plates for restricting the support member from moving out of the bearing frame, and the two first limiting plates are respectively connected to another end of the side plate and another end of the bottom plate; the supporting frame further comprises: an inclined plate to which a prism is mounted, and second limiting plates respectively connected to two ends of the inclined plate and each having an included angle with respect to the inclined plate; the connecting portion comprises one end connected to a middle part of the inclined plate, and another end passing through the elastic member and inserted in the supporting plate; and the two second limiting plates respectively correspond to the two first limiting plates.

9. A periscope lens module, comprising:
a shell frame;
a lens assembly mounted to a middle part of the shell frame;
an image sensor mounted to an end of the shell frame and located at an image side of the lens assembly; and
a prism device applied to the periscope lens module, wherein the prism device comprises:
a bearing frame;
an elastic member;
a driving member;
a supporting member; and
a prism mounted to the supporting member and configured to receive light,
wherein the supporting member is rotatably mounted to the bearing frame through the elastic member, the driving member is connected between the supporting member and the bearing frame and configured to drive the supporting member and the prism to rotate relative to the bearing frame, the elastic member comprises a first elastic frame and a second elastic frame, the supporting member comprises a relying portion, the first elastic frame comprises a first clamping portion, the second elastic frame comprises a second clamping portion, and the first clamping portion and the second clamping portion clamp the relying portion from two opposite sides thereof in such a manner that the supporting member is rotatable about the relying portion, the bearing frame comprises a side plate, and a bottom plate having an end connected to an end of the side plate; the supporting member further comprises a supporting frame connected to the prism, and a supporting plate spaced apart from and opposite to the side plate of the bearing frame; the supporting frame comprises a connecting portion connected to the supporting plate; the relying portion is provided on the connecting portion; and the first elastic frame and the second elastic frame are located between the connecting portion and the bottom plate of the bearing frame,
wherein the first clamping portion comprises two ends that are opposite to each other, and the first elastic frame further comprises: two first extending portions extending from the two ends of the first clamping portion while being bent, two first bending portions each connected to an end of one of the two first extending portions, two second extending portions each extending from an end of one of the two first bending portions, and two first mounting portions each bent from an end of one of the two second extending portions; the second clamping portion comprises two ends that are opposite to each other, and the second elastic frame further comprises: two third extending portions extending from the two ends of the second clamping portion while being bent, two second bending portions each connected to an end of one of the two third extending portions, two fourth extending portions extending from an end of one of the second bending portions, and two second mounting portions bent from an end of one of the two fourth extending portions; the bottom plate of the bearing frame is provided with two snap grooves, and each of the first mounting portion and the second mounting portion is snapped into a corresponding one of the two snap grooves, and wherein the prism device is mounted to another end of the shell frame and located at an object side of the lens assembly for receiving light.

10. The periscope lens module as described in claim 9, wherein the relying portion comprises a top surface and a bottom surface that are opposite to each other, the bottom surface faces towards the bottom plate of the bearing frame, and the top surface faces away from the bottom plate of the bearing frame; and the top surface and the bottom surface of the relying portion both protrude from any other part of the connecting portion close to the relying portion.

11. The periscope lens module as described in claim 10, wherein a direction from one end to the other end of the first clamping portion is defined as a length direction of the first clamping portion, and a direction perpendicular to the length direction and parallel to the connecting portion is defined as a width direction of the first clamping portion; and a middle portion between the two ends of the first clamping portion is provided with an abutting portion having an increased width smaller than or equal to a width of the relying portion; or a direction from one end to the other end of the second clamping portion is defined as a length direction of the second clamping portion, and a direction perpendicular to the length direction of the second clamping portion and parallel to the connecting portion is defined as a width direction of the second clamping portion; and a middle portion between the two ends of the second clamping portion is provided with an abutting portion having an increased width smaller than or equal to the width of the relying portion.

12. The periscope lens module as described in claim 9, wherein the first bending portion and the second bending portion are parallel to the bottom plate of the bearing frame, respectively; and the first extending portion, the second extending portion and the fourth extending portion are each perpendicular to the bottom plate of the bearing frame.

13. The periscope lens module as described in claim 9, wherein the driving member comprises a plurality of shape memory alloy wires connected between the supporting plate and the side plate of the bearing frame.

14. The periscope lens module as described in claim 13, wherein the bearing frame further comprises a plurality of snap joints provided on the side plate, the supporting plate is mounted to the plurality of snap joints through the plurality of shape memory alloy wires, and a side of the supporting plate facing towards the side plate is provided with a plurality of hooks for matching the plurality of snap joints and fixing the plurality of shape memory alloy wires.

15. The periscope lens module as described in claim 14, wherein the plurality of shape memory alloy wires comprises four shape memory alloy wires, the plurality of snap joints comprises four snap joints and the plurality of hooks comprises four hook; and each of the four shape memory alloy wires comprises two ends respectively connected to two adjacent snap joints of the four snap joints, and a middle portion connected to one of the four hooks.

16. The periscope lens module as described in claim 9, wherein the bearing frame further comprises two first limiting plates for restricting the support member from moving out of the bearing frame, and the two first limiting plates are respectively connected to another end of the side plate and another end of the bottom plate; the supporting frame further comprises: an inclined plate to which a prism is mounted, and second limiting plates respectively connected to two ends of the inclined plate and each having an included angle with respect to the inclined plate; the connecting portion comprises one end connected to a middle part of the inclined plate, and another end passing through the elastic member and inserted in the supporting plate; and the two second limiting plates respectively correspond to the two first limiting plates.

* * * * *